Nov. 17, 1931.  A. HOLMES ET AL  1,832,461
METHOD OF CONVERTING MATERIALS CONTAINING LEAD
SULPHIDE TO OXYGENATED COMPOUNDS
Filed June 22, 1927
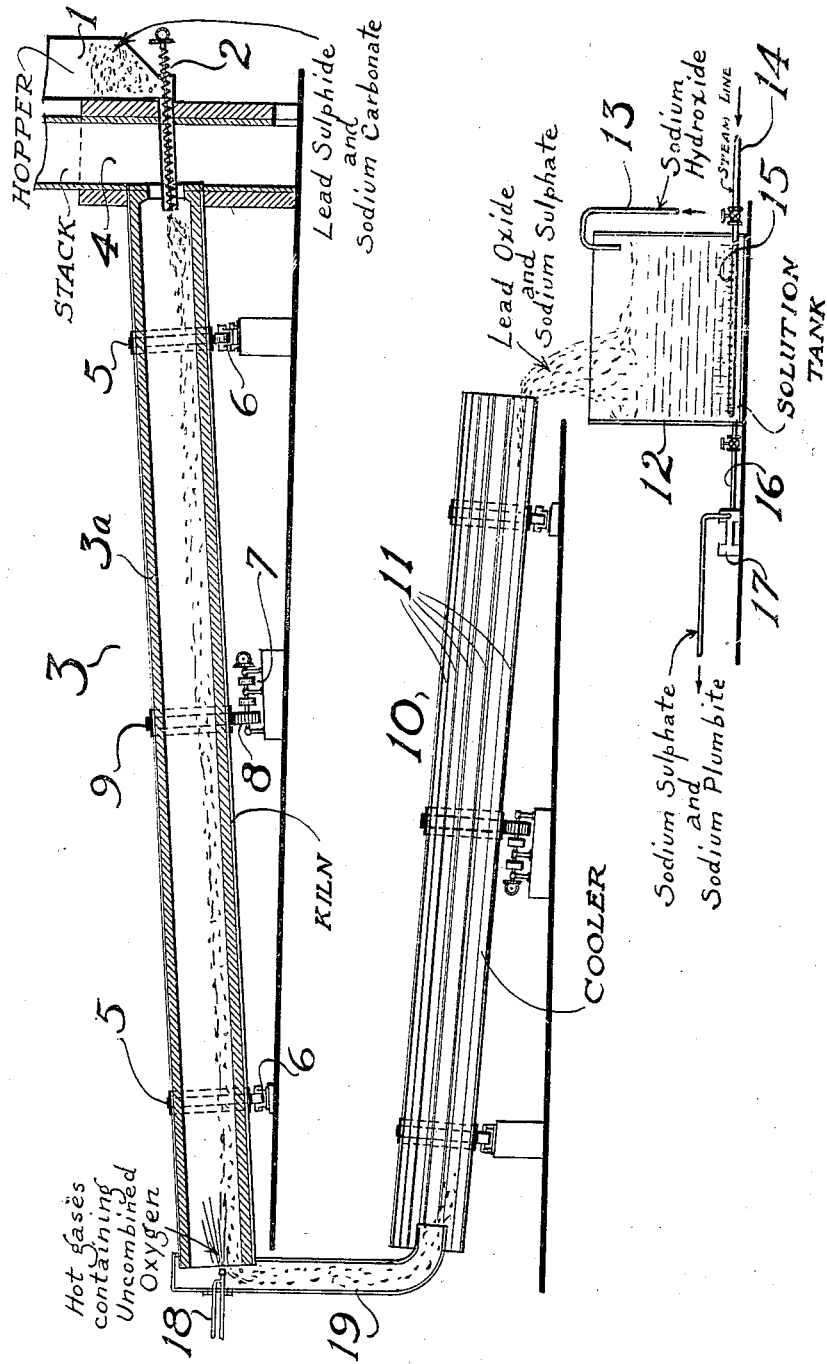
Inventors
AUGUST HOLMES
LOUIS BURGESS
By their Attorney Patented Nov. 17, 1931

1,832,461

UNITED STATES PATENT OFFICE

AUGUST HOLMES, OF NEWARK, AND LOUIS BURGESS, OF ROSELLE, NEW JERSEY, ASSIGNORS TO STANDARD OIL DEVELOPMENT COMPANY, A CORPORATION OF DELAWARE

METHOD OF CONVERTING MATERIALS CONTAINING LEAD SULPHIDE TO OXYGENATED COMPOUNDS

Application filed June 22, 1927. Serial No. 200,537.

This invention relates to the conversion of lead sulphide, or materials containing the same, to oxygenated compounds of lead and has for its objects, the more efficient and economical conversion thereof.

Lead sulphides and residues containing same are produced in certain operations. A solution of litharge in caustic is used in the petroleum industry for the treatment of distillates and a residue containing lead sulphide settles out or may be separated from this solution or from the oil after such treatment. A particularly advantageous use of our process is in the reconversion of such residues to a form in which they may be again used in the treatment of petroleum distillates. In accordance with our process lead sulphide or residues containing same are mixed with alkali metal carbonate or bicarbonate and roasted in contact with an oxidizing gas. The term "oxidizing gas" comprehends either a gas containing elemental oxygen or compounds which will yield oxygen to the sulphide-bearing materials. The proportion of carbonate or bicarbonate used may vary over considerable limits but is preferably so adjusted as to furnish an equivalent of $Na_2O$ for each equivalent of $SO_3$ in the finished product. Under these conditions the reaction product consists of lead oxide and sodium sulphate. However, the product may be made to contain double compounds of sodium and lead by increasing the amount of carbonate or bicarbonate added. In practice, we find it preferable to add 10-20% by weight of sodium carbonate based on the lead sulphide present in the material charged. The roasting is preferably carried out at temperatures below that at which the charge melts or becomes pasty and temperatures between 500-800° C. are preferred. The time of heating should be such as to insure substantially complete oxidation of the lead sulphide in the original charge and may vary from a few minutes to several hours, depending on the temperature, porosity and composition of the charge. The heating may be indirect, an atmosphere yielding oxygen being supplied in any suitable manner or may be direct, in which case oxidation will result from the gases necessarily present and these should, for best results, be adjusted to contain uncombined oxygen. Our preferred method of carrying out the process comprises feeding the materials continuously into one end of an inclined cylinder lined with refractory material. The cylinder is slowly rotated to insure a gradual progress of the charge and heated by a burner located at the discharge end. The sulphide-bearing material and carbonate or bicarbonate may be premixed or added separately in which event mixing will take place in the cooler end of the cylinder. The burner is preferably operated so that the material discharged will have a temperature of 500–800° C. The roasted material is cooled in any suitable manner. It may be dissolved in caustic solution and thereby made available for reuse in treating petroleum distillates. Solution in caustic is accelerated by mixing and heating.

The accompanying drawing shows a longitudinal section of apparatus suitable for carrying out the process. Our preferred method of operation will be described with reference thereto. The hopper 1 contains a supply of sulphide-bearing residue mixed with the desired quantity of carbonate or bicarbonate. This is fed continuously by means for worm conveyor 2, actuated in any suitable manner to the kiln 3. Gaseous products of combustion escape by means of stack 4. The kiln 3 is lined with refractory material 3a and is carried by rings 5 bearing on wheels 6. It is caused to rotate by any suitable mechanism such as a motor operating speed reducer 7, which in turn actuates the driving gear 8 and the ring gear 9. Because of this rotation, materials charged move gradually toward the lower end of the cylinder and are heated by means of burner 18 to the desired temperature. The heated materials discharged through chute 19 into cooler 10, which is a steel shell rotated in the same manner as the kiln and preferably equipped with a series of longitudinal vanes 11, which alternately lift and then drop the material. The cooled material is discharged from the lower end of the kiln into tank 12 which may be supplied by a solution of caustic in any manner, cf. by means of pipe 13. The contents of the tank may be heated and mixed by means of steam from the valved pipe 14 introduced into the tank through distributor 15. When desired, the solution may be withdrawn through valved pipe 16 by means of pump 17.

It will be understood that the apparatus shown is in illustration merely and that the process is not in any way limited thereby.

We claim:

1. The method of converting lead compounds, contained in residues obtained from treatment of petroleum distillates with an aqueous solution of lead oxide in caustic alkali, to an oxide of lead, which comprises adding an alkali metal carbonate to the residues and heating the same in contact with a gas capable of yielding oxygen thereto.

2. The method of converting lead compounds, contained in residues obtained from treatment of petroleum distillates with an aqueous solution of lead oxide in caustic alkali, to an oxide of lead, which comprises adding an alkali metal carbonate to the residues, heating the same in contact with a gas capable of yielding oxygen to the material, and dissolving the oxide of lead produced in an aqueous solution of a caustic alkali for use in further treatment of petroleum distillates.

3. Method according to claim 1, in which the heating is carried out at temperatures between 500° and 800° C.

4. Method according to claim 1, in which the mixture of residues and alkali metal carbonate passes in counter current relation to the hot gases.

AUGUST HOLMES.
LOUIS BURGESS.